United States Patent
Hutson et al.

[11] Patent Number: 5,746,849
[45] Date of Patent: May 5, 1998

[54] TIRE TREAD INCLUDING TIE BAR

[75] Inventors: David Dean Hutson; Christopher Paul Johenning, both of Akron; John Janis Taube, Tallmadge; Terry John Waibel, Wadsworth, all of Ohio

[73] Assignee: The Goodyear Tire & Rubber Company, Akron, Ohio

[21] Appl. No.: 570,305

[22] Filed: Dec. 11, 1995

[51] Int. Cl.$^6$ .................... B60C 103/04; B60C 115/00
[52] U.S. Cl. ........................ 152/209 R; 152/209 D
[58] Field of Search .................... 152/209 R, 209 D

[56] References Cited

U.S. PATENT DOCUMENTS

| | | | |
|---|---|---|---|
| 1,504,694 | 8/1924 | Litchfield | 152/209 R |
| 3,554,259 | 1/1971 | Webb | 152/352 |
| 3,559,712 | 2/1971 | Verdier | 152/209 |
| 4,057,089 | 11/1977 | Johannsen | 152/209 R |
| 4,262,721 | 4/1981 | Tadokoro et al. | 152/209 |
| 4,284,115 | 8/1981 | Ohishi | 152/209 |
| 4,722,378 | 2/1988 | Carolla et al. | 152/209 |
| 4,773,459 | 9/1988 | Yamaoka et al. | 152/209 R |
| 4,945,966 | 8/1990 | Ogawa | 152/209 |
| 4,984,616 | 1/1991 | Shepler et al. | 152/209 |
| 5,154,783 | 10/1992 | Kuhr et al. | 152/209 R |
| 5,228,933 | 7/1993 | Kawabata et al. | 152/209 |
| 5,240,053 | 8/1993 | Baumhofer et al. | 152/209 R |
| 5,360,043 | 11/1994 | Croyle et al. | 152/209 |
| 5,361,816 | 11/1994 | Hitzky | 152/209 R |
| 5,421,390 | 6/1995 | Gerard et al. | 152/209 |
| 5,429,164 | 7/1995 | Mitsutake | 152/209 |
| 5,439,040 | 8/1995 | Iwamura | 152/209 |
| 5,450,885 | 9/1995 | Hanya | 152/209 |
| 5,538,060 | 7/1996 | Van der Meer et al. | 152/209 R |

FOREIGN PATENT DOCUMENTS

| | | | |
|---|---|---|---|
| 235072A2 | 9/1987 | European Pat. Off. | B60C 11/04 |
| 246995A2 | 11/1987 | European Pat. Off. | B60C 11/11 |
| 402595A2 | 12/1990 | European Pat. Off. | B60C 11/04 |
| 402595A3 | 12/1990 | European Pat. Off. | B60C 11/04 |
| 586124 | 3/1994 | European Pat. Off. | 152/209 R |
| 602989 | 6/1994 | European Pat. Off. | 152/209 R |
| 6-27332A1 | 12/1994 | European Pat. Off. | B60C 11/04 |
| 627332 | 12/1994 | European Pat. Off. | 152/209 R |
| 640497A3 | 3/1995 | European Pat. Off. | B60C 11/00 |
| 0705718A2 | 4/1996 | European Pat. Off. | 11/3 |
| 0713789A1 | 5/1996 | European Pat. Off. | 11/3 |
| 3522967 | 1/1987 | Germany | 152/209 R |
| 1-022601 | 1/1989 | Japan | B60C 11/04 |
| 182505 | 7/1990 | Japan | 152/209 R |
| 32907 | 2/1991 | Japan | 152/209 D |
| 189211 | 8/1991 | Japan | 152/209 R |
| 3-295705 | 12/1991 | Japan | B60C 11/04 |
| 4-108005 | 4/1992 | Japan | B60C 11/04 |
| 317805 | 11/1992 | Japan | 152/209 R |

*Primary Examiner*—Steven D. Maki
*Attorney, Agent, or Firm*—Roger D. Emerson

[57] ABSTRACT

A directional, symmetrical tread 12 for a tire 10 is disclosed. The tread 12 has a row 40 of elements 30, 32 which have leading and trailing edge surfaces relative to the direction of forward travel. Between the leading edge 70 of the second element and the trailing edge 74 of the first element is a tie bar 66 having a radial height which varies across the lateral width of the tie bar 66 and circumferential length of the tie bar 66.

8 Claims, 3 Drawing Sheets

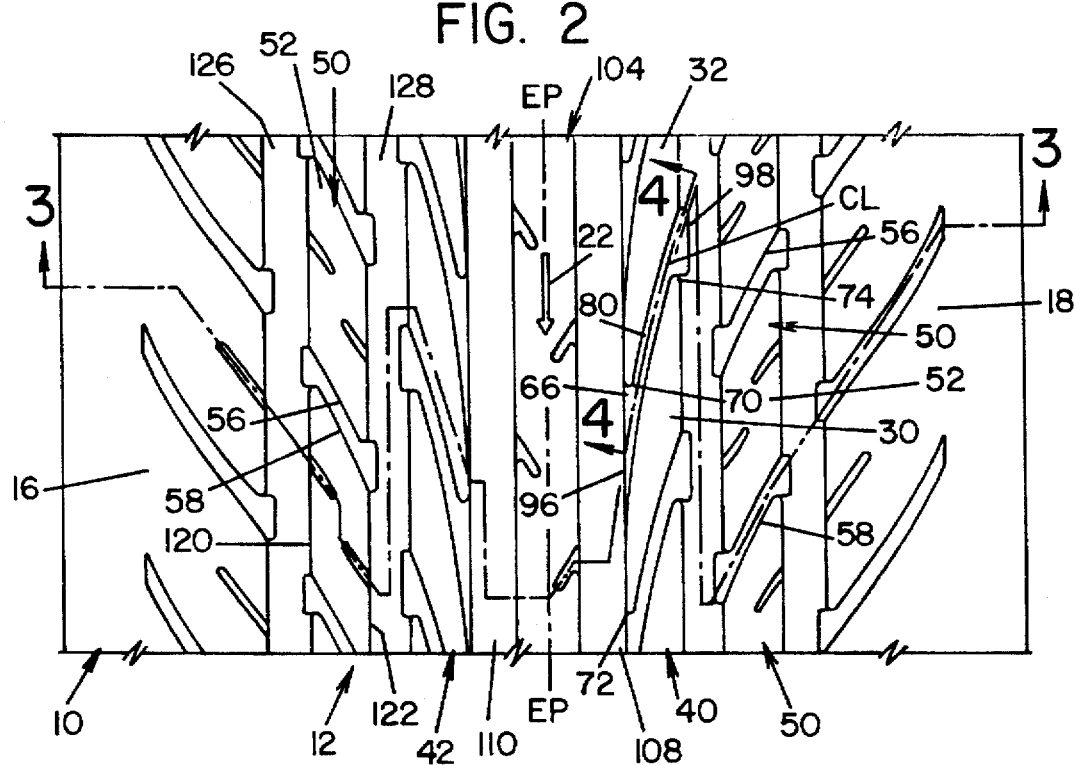
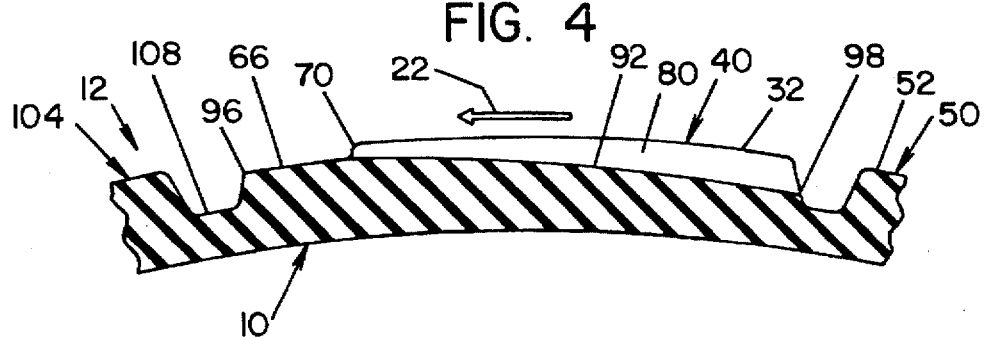

TIRE TREAD INCLUDING TIE BAR

BACKGROUND OF THE INVENTION

The invention relates to a tread for a pneumatic tire, the tread having a tie bar connected to and extending between first and second elements in the tread. The first and second elements are an equal lateral distance for any plane parallel to the tire's equatorial plane EP. The tread is particularly well-suited for use on high performance tires, and especially for use on wet road surfaces.

Tires used for racing and other high performance vehicles require good performance in a variety of tire performance parameters, such as cornering and turning response, steering responsiveness, braking responsiveness, durability, and wet and dry traction. Ideally, the tires permit the vehicle to perform to its full design potential regardless of the road conditions. For example, the tires ideally will be capable of maintaining traction in high speed turns, transfer the acceleration torque the engine produces to the road without spinning the tires, provide braking traction at high speed capable of stopping the vehicle in as short a distance as is feasible without damaging the tires or vehicle, and provide a tire with reasonable tread wear.

To meet the needs of the high performance vehicles, certain improvements in the tires have been desirable.

The present invention allows for certain improvements in these parameters while providing an attractive design appearance for high performance tires.

SUMMARY OF THE INVENTION

A tread for a tire is disclosed. The tread when annularly configured has an axis, first and second lateral edges, and a tread surface. The tread further includes first and second elements which are an equal lateral distance from the plane parallel to the tire's equatorial plane EP. A tie bar is connected to and extends between the first and second elements.

According to a further aspect of the invention, a tread for a tire includes a first element, a second element, and a tie bar connected to and extending between the first and second elements. The tie bar has a first lateral edge and a second lateral edge. The tie bar also has a radial height, the radial height of the tie bar varies across the surface of the tie bar.

According to a still further aspect of the invention, a tread for a tire includes a center rib, a first row of elements, and a second row of elements. The net-to-gross ratio of the working rib 116 portion is between 42% and 62% and the net-to-gross ratio of the rest of the tread is between 40% and 65%.

According to a still further aspect of the invention, a tread for a tire includes a center rib, a first row of elements, and a second row of elements. The elements in the first and second rows have circumferential length at least four times their lateral width. A ground engaging surface of the element in the first row are convex radially outwardly. The tread is symmetrical and directional. The elements have a radial height between 0.15 inches and 0.40 inches, and preferably between 0.19 inches and 0.35 inches, when measured from the base of full-depth circumferential groove. The tread elements in a tire designed to be mounted on the front of a vehicle are buttressed on a groove wall of the leading edge of the element, while tread elements designed to be used on a powered axle of a vehicle have buttressing on the groove wall of the trailing edge of the elements. The tread's net-to-gross ratio is between 40% and 60%. A first element in a first row of the tread has first and second lateral edges. The first lateral edge of the first element has a radius of curvature between 0.09 inches and 0.20 inches, with the preferred radius of curvature being 0.118 inches (3 mm). This radius of curvature helps reduce turbulent flow of water removed from the footprint of the tire as it flows over the first lateral edge of the first element.

DEFINITIONS

"Axial" and "axially" are used herein to refer to lines or directions that are parallel to the axis of rotation of the tire.

"Circumferential" means lines or directions extending along the perimeter of the surface of the annular tread perpendicular to the axial direction.

"Radial" and "radially" are used to mean directions radially toward or away from the axis of rotation of the tire.

"Lateral" means an axial direction.

"Leading edge" means an edge of a block element, the edge being angularly oriented over a majority of its length between 0° and 45° relative to a plane parallel to the axis of rotation and wherein the leading edge enters the footprint of a forward rolling tire prior to the circumferentially aligned remaining portions of the block element.

"Trailing edge" means an edge of a block element, the edge being angularly oriented over a majority of its length between 0° and 45° relative to a plane parallel to the axis of rotation and wherein the trailing edge is the last portion of the block element to enter the footprint of a forward rolling tire relative to the circumferentially aligned portions of the block element.

"Compensated Tread Width" means the tread width multiplied by the aspect ratio.

"Aspect Ratio" of a tire means the ratio of the section height to the section width.

"Footprint" means the contact patch or area of contact of the tire tread with a flat surface at zero speed and under normal load and pressure, including the area occupied by grooves as well as the tread elements.

"Net-to-gross" means the total area of ground contracting tread elements within the footprint divided by the gross area of the footprint.

"Groove" means an elongated void area in a tread that may extend circumferentially or laterally about the tread in a straight, curved, or zigzag manner. Circumferentially and laterally extending grooves sometimes have common portions and may be subclassified as "wide", "narrow", or "slot". The slot typically is formed by steel blades inserted into a cast or machined mold or tread ring therefor. In the appended drawings, slots are illustrated by single lines because they are so narrow. A "slot" is a groove having a width in the range from about 0.2% to 0.3% of the compensated tread width, whereas a wide groove has a width (W) greater than 2% of the compensated tread width, an intermediate width groove has a width ⅓ to ¾ W, and a narrow groove has a width of ¹/₁₀ to ⅓ W. The "groove width" is equal to tread surface area occupied by a groove or groove portion, the width of which is in question, divided by the length of such groove or groove portion; thus, the groove width is its average width over its length. Grooves, as well as other voids, reduce the stiffness of the tread regions in which they are located. Slots often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Sipe" means a small slot molded into the tread elements of a tire that subdivide the tread surface and improves traction.

"Inside Shoulder" means the shoulder farthest away from the vehicle.

"Rib" means a circumferentially extending strip of rubber on the tread which is defined by at least one circumferential groove and either a second such groove or a lateral edge, the strip being laterally undivided by full-depth grooves.

"Tread Element" means a rib or a block element.

"Equatorial plane (EP)" means the plane perpendicular to the tire's axis of rotation and passing through the center of its tread.

BRIEF DESCRIPTION OF THE DRAWINGS

FIG. 2 is an enlarged fragmentary developed view of a portion of the tread in FIG. 1.

FIG. 4 is a cross-sectional view taken along line 4—4 of FIG. 2.

DETAILED DESCRIPTION OF THE INVENTION

Figure 1:
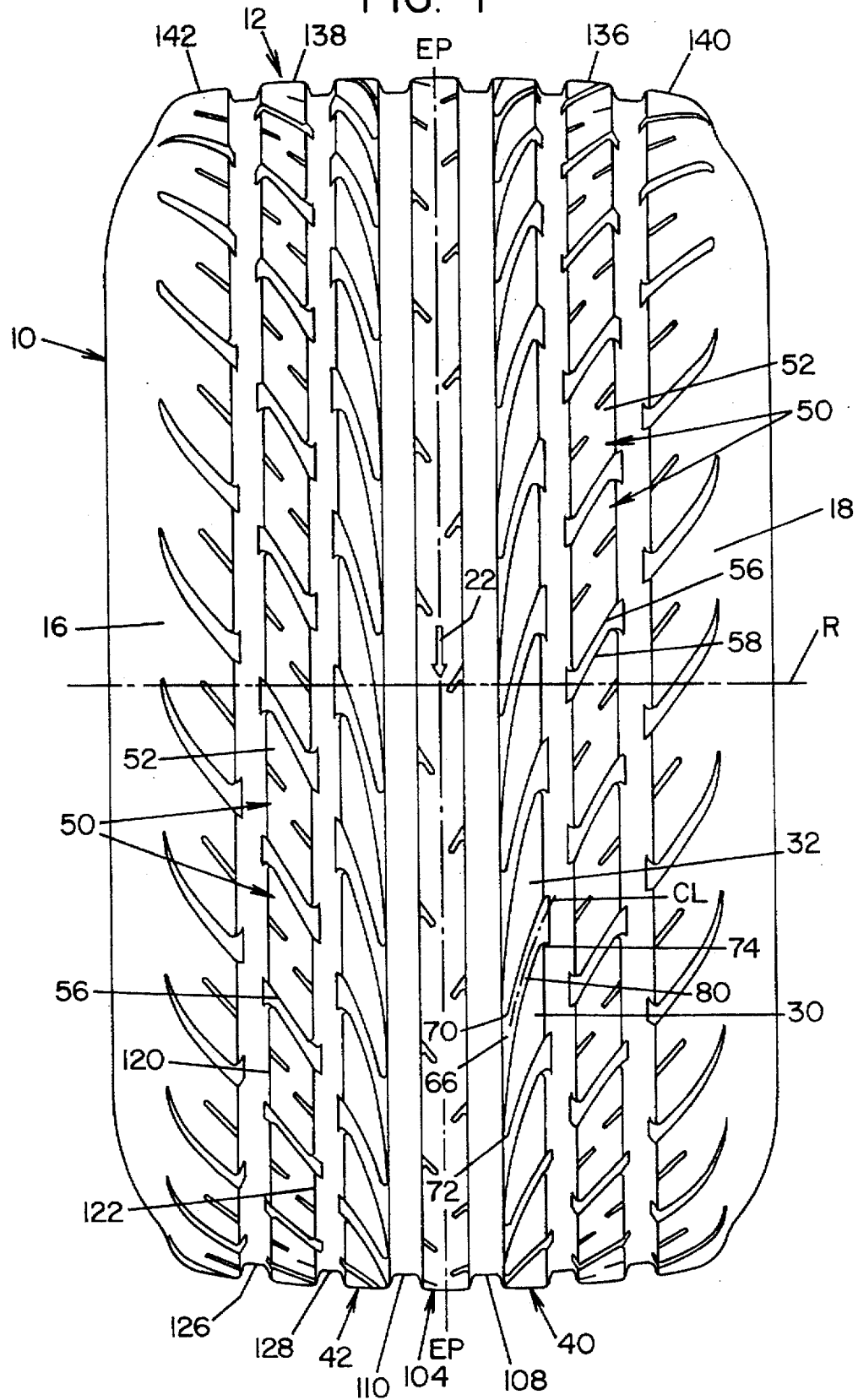
FIG. 1 is a front elevational view of a tire having a tread made in accordance with the present invention.

In FIG. 1, a tire 10 has a tread 12 which has an equatorial plane EP, an axis R, and first and second lateral edges 16, 18. The tread 12 has a net-to-gross ratio of 42% to 70%, and more preferably 42% to 62%, and most preferably 52%.

The tread 12 has a directional tread pattern, meaning the tread has an intended direction of forward travel when the tire bearing the tread 12 is mounted to a vehicle. This intended direction of forward travel is indicated by arrow 22. The shoulder regions of the tire are adjacent the lateral edges 16, 18.

The tread 12 includes block elements 50 which have a ground contacting surface 52. The ground contacting surface 52 extends circumferentially from a leading edge 56 of the element to a trailing edge 58.

With reference to FIGS. 1–4, one of the important features of the inventive tread 12 is tie bar 66. The tie bar 66 is connected to and extends between a first tread element 30 and a second tread element 32. The first and second tread elements 30, 32 are an equal lateral distance from a plane parallel to the tire's equatorial plane EP. In other words, the first element 30 is circumferentially aligned with the second tread element 32, with the first tread element 30 entering the tire footprint prior to the second tread element 32 when the tire 10 is being rotated in its intended direction.

One of the important aspects of a tie bar 66 according to the invention is that the tie bar 66 increases the lateral stiffness of the tread 12. Previously, tie bars 66 were disposed in essentially lateral directions, thereby increasing the circumferential stiffness of treads.

The tie bar 66 has a width essentially equal to the width of the first element 30 or the second element 32.

One of the important features of the tread 12 is the circumferential overlapping nature of elements 30, 32 in a first row 40 or second row 42. A leading point 70 of the second element 32 is circumferentially closer to a leading point 72 of the first element 30 than a trailing point 74 of the first element 30 is to the leading point 72 of the first element 30. In other words, the leading point 70 of the second element 32 overlaps the trailing point 74 of the first element 30. This overlap defines a lateral groove 80. The lateral groove 80 has a groove centerline CL. The groove centerline CL makes an angle greater than 0 degrees and less than 20 degrees with the tire's equatorial plane EP.

The first and second elements 30, 32 are configured so that they are relatively elongated compared to conventional tread elements. When the length of the first element 30 is defined as the distance between radial planes tangent to the elements circumferential extremities, the distance being measured along the surface of the element 30, and when the width of the first element 30 is defined as a distance between planes parallel to the tire's equatorial plane and tangent to the element's lateral extremities, the length of the first element 30 is at least four times with width of the first element 30. The ratio of the length of the first element 30 to the width of the first element 30 is between 4.0 to 1 and 16.0 to 1, and preferably between 6.0 to 1 and 10.0 to 1. In the preferred embodiment, the ratio is 8.8 to 1.

With reference to FIG. 2, another way to describe the configuration of the first element 30 is by comparing its axial centerlines along its length and width. For ease of illustration, the configuration of the first element 30 will be described with reference to a similarly configured element 150. The axial length centerline 154 is defined as a line which bisects opposite sides of the element 150 and divides the element 150 into two sections of equal area. The axial width centerline 158 is defined as a line which bisects opposite sides of the element 150 and divides the element 150 into two sections of equal area. The length of the axial length centerline 154 of the element 150 is at least three times the length of the axial width centerline 158 of the element 150, with the preferred embodiment having an axial length centerline 3.95 times the length of the axial width centerline of the element 150.

Figure 3:
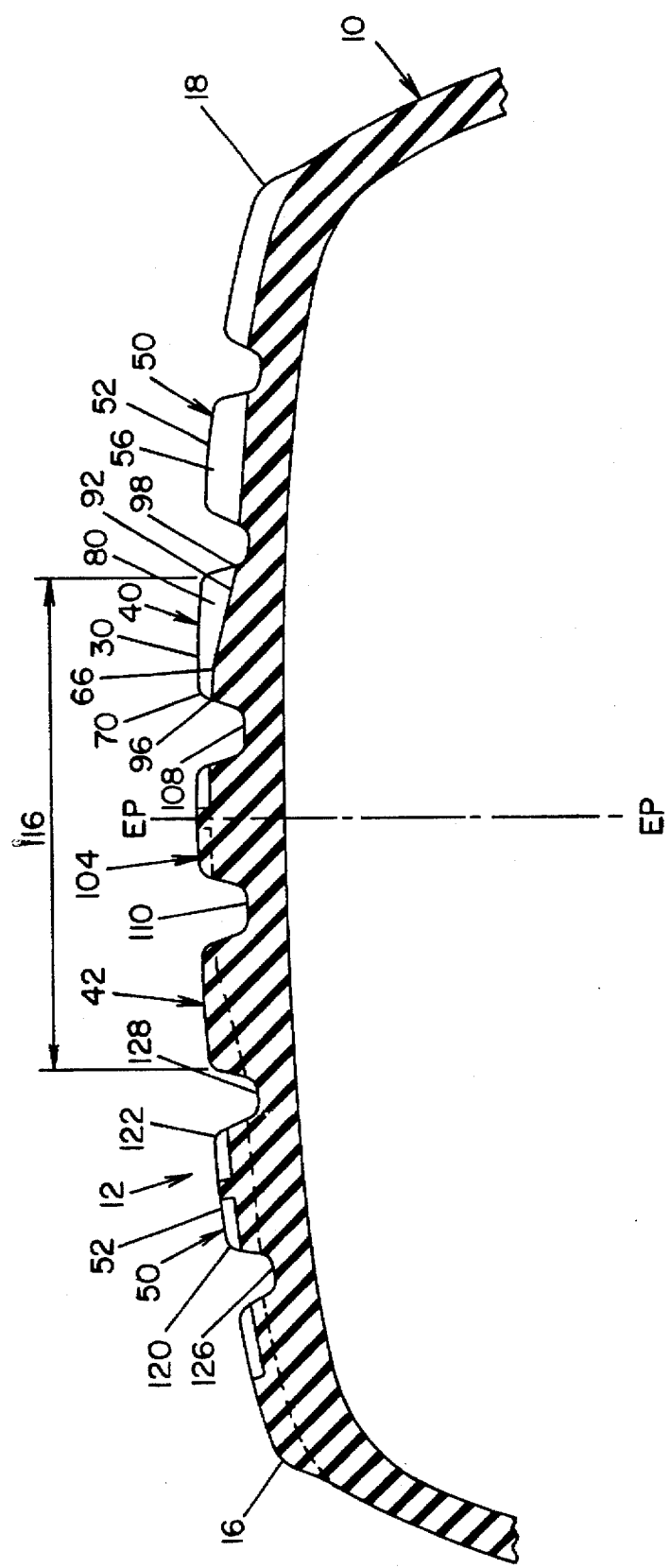
FIG. 3 is a further enlarged view of a portion of the tread in FIG. 1 taken along line 3—3 of FIG. 2.

An important aspect of the tie bar 66 is that the radial height of the tie bar varies across a radially outward surface 92 of the tie bar 66. More specifically, with reference to FIGS. 1, 3, and 4, this feature of the tie bar 66 is illustrated. FIG. 4 indicates a view of the tie bar 66 taken essentially along the centerline of lateral groove 80. It is clear from FIG. 4 that the radial height of the tie bar 66 is greatest at point 96 and least at point 98. The tie bar 66 has a radially outward surface 92. With reference to FIG. 3, it is clear that the radial height of the tie bar 66 varies from a first lateral edge 96 to a second lateral edge 98 of the tie bar 66. Similarly, the radial height of the tie bar 66 varies from a leading point 70 of the second element 32 to the trailing point 74 of the first element 30. The radial height of the tie bar 66 is greatest at the first lateral edge 96 of the tie bar 66 and least at the second lateral edge 98 of the tie bar 66.

One advantage of varying the radial height of the tie bar 66 in this way is that it strengthens and stiffens otherwise less stiff portions of a tread element. This enables the tire designer to design elongated tread elements, such as the first element 30 or the second element 32, and still provide adequate and effective element stiffness. For example, with reference to FIG. 2, the leading point 70 of the second element 32 is part of an elongated finger-like projection, especially when viewed in comparison with the rest of the first element 30 or in comparison to more conventionally-shaped elements such as element 52. The radial height of the tie bar 66 is greatest near the leading point 70 of the second element 32 and least near the second lateral edge 98 of the tie bar 66, which is near the stiffest portion of the first element 30.

According to another important aspect of the invention, the tread 12 includes an essentially continuous center rib 104. On either side of the center rib 104 is the first row 40 of elements and the second row 42 of elements. The center rib 104, first row of elements 40 and second row of elements 42 together define two continuous, full-depth, circumferential grooves 108,110. Because of the elongated-shape of the first and second elements 30, 32, the first and second rows of elements 40, 42 behave similarly to a continuous rib, such as the center rib 104. This provides a cohesive center portion of the tire 10 which, to some degree, acts as a single unit. This unit is described in this document as a "working rib" 116. The width of the working rib 116 is equal to between 30% and 50%, and preferably 40%, of the tire's tread width.

Because of the elongated-shape of the first and second elements 30, 32, and because of the strengthening capabilities of the tie bar 66, the working rib 116 provides improved properties. The net-to-gross ratio of the first row 40 or second row 42 can be between 60% and 75%, with the preferred net-to-gross ratio of the first and second row 40,42 being 71%. Furthermore, the net-to-gross ratio of the working rib 116 portion of the tread 12 is between 45% and 60%, with the net-to-gross ratio of the preferred embodiment being 52%. The net-to-gross ratio of the rest of the tread 12 is about the same, ranging between 45% and 60%, with the preferred embodiment being about 52%. The working rib 116 is between 2% and 4% stiffer, and preferably about 2.8% stiffer, than the rest of the tread 12.

Another important aspect of the invention is the curvature of the ground contacting surface 52 of the elements 30, 32. The ground contacting surface 52 is convex radially outward, as described in U.S. Pat. No. 4,722,378, which is incorporated herein in its entirety by reference.

In addition to this curvature, the lateral edges of the individual elements are curved. For example, with reference to FIG. 3, lateral edges 120, 122 are curved in a representative way and will be used for illustration. In fact, all of the lateral edges in all of the elements in preferred embodiment of the tread 12 are curved as is described following, as a means to prevent or inhibit turbulent flow of water flowing over the lateral edges 120, 122 of the element. This features encourages the water to more quickly leave the footprint and to flow into the grooves 126, 128, thus maintaining better wet traction. The radius of curvature of the edges of the tread elements is between 0.02 inches (0.51 mm) and 0.2 inches (5.08 mm), and preferably between 0.09 inches (2.29 mm) and 0.2 inches (5.08 mm), with the most preferred radius of curvature being 0.118 inches (3.00 mm).

With reference to FIG. 4, another important aspect of the inventive tread 12 will be described. In a preferred embodiment of the invention, the tire 10 has one type of tread 12 if the tire 10 is intended to be used on a front axle of the vehicle (usually an undriven axle, e.g. in Formula I racing vehicles) and a slightly different type of tread 12 if the tire 10 is intended to be used on a rear axle (usually a driven or powered axle) of a vehicle. The tread elements in a tire 10 designed to be mounted on the front axle of a vehicle are buttressed on a groove wall of the leading edge of the element. This is intended to strengthen the element for the braking forces which act primarily on the front tires of the vehicle. Similarly, the tread elements of the tread of a tire designed to be used on a powered axle of a vehicle have buttressing on the groove wall of the trailing edge of the elements, to strengthen them against the torque generated by acceleration of the engine. In FIG. 4, the leading point 70 of the second element 32 is buttressed.

This buttressing is accomplished by designing the groove walls in question so that they are not parallel to radial planes of the tire 10. Instead, they angle inwardly toward the center of the element in question as they rise toward the ground-contacting surface of the element 32. With reference to FIG. 4, the groove wall 162 makes an angle greater than 0 degrees and less than 20 degrees, and preferably an angle about 10 degrees, with a plane passing through the tire's 10 axis R.

Another important aspect of the inventive tread 12 is its relatively constant net-to-gross ratio but its increasing void capacity as one moves from the tire's equatorial plane EP to the lateral edges 16, 18 of the tread 12. For example, with reference to FIG. 3, the preferred embodiment tread 12 has a center rib 104, first row of elements 40, a second row 42 of elements, a third row of elements 136, a fourth row of elements 138, a fifth row of elements 140, and a sixth row 142 of elements. In the preferred embodiment, net-to-gross ratio of the center rib 104 is 95%, the net-to-gross ratio of the first and second rows 40,42 is 71%, the net-to-gross ratio of the third and fourth rows 136,138 is 83%, and the net-to-gross ratio of the fifth and sixth rows 140,142 is 84%. Nonetheless, the net-to-gross ratio of the working rib 116 is 52% and the net-to-gross ratio of the remaining portions of the tire is also 52%. It follows that the overall net-to-gross ratio of the entire tread 12 is also 52%, meaning it has uniform net-to-gross ratio across the tread 12.

However, with reference to FIGS. 3 and 4, it is apparent that the void capacity of the tread 12 increases as one moves laterally outwardly from the tire's 10 equatorial plane EP to the lateral edges 16,18 of the tread 12. This is perhaps best seen in FIG. 3 where the varying height of tie bar 66 clearly indicates a greater capacity in the lateral grooves 80 to envelop and accommodate water pushed outwardly from center of the tire's 10 footprint. Therefore, although the tread 12 has a uniform net-to-gross ratio, the tread 12 has more capacity to envelop and contain water in the grooves of the tread 12 near its lateral edges 16, 18 than it does at the tire's 10 equatorial plane EP. This quality enhances the tire's 10 ability to maintain effective wet traction on rain slicked road surfaces.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A pneumatic tire having an equatorial centerline and a tread, said tread having first and second circumferentially aligned wedge-shaped tread elements positioned between first and second circumferential grooves, each of said tread elements having a ground contacting surface and spaced lateral edges defining a tread element width, a stiffness of each of said tread elements increasing from said lateral edge nearest said equatorial centerline to said other lateral edge, each wedge shaped tread element having a circumferentially extending linear base defining said other lateral edge, a first curved inclined side and a second curved inclined side, said tread further having a tie bar extending between said first and second tread elements, said tie bar being inclined and having a centerline making an angle between 0 degrees and 20 degrees with said equatorial centerline, said tie bar having first and second spaced lateral edges defining a tie bar width, said tie bar width being essentially equal to said tread element width, said tie bar having a radial height decreasing from said first lateral edge to said second lateral edge.

2. The tire of 1 wherein said first tread element has circumferentially leading and trailing points defining a tread element length, said first element leading point entering a footprint of said tire before said trailing point when said tire is travelling in a forward direction, said second tread element having a leading point circumferentially spaced from said first element leading point a distance shorter than said tread element length.

3. The tire of claim 2 wherein said tie bar extends between said leading point of said second tread element and said trailing point of said first tread element.

4. The tire of claim 2 wherein a ratio of said tread element length to said tread element width is between 4.0 to 1 and 16.0 to 1.

5. The tire of claim 2 wherein a ratio of said tread element length to said tread element width is between 6.0 to 1 and 10.0 to 1.

6. The tire of claim 1 wherein said first lateral edge of said tie bar is essentially parallel to said equatorial centerline.

7. The tire of claim 1 wherein said first tread element comprises a groove wall making an angle of between 0 degrees and 20 degrees with a radial plane.

8. The tire of claim 1 wherein each of said lateral edges of said tread elements comprise a radius of curvature between 0.02 inches and 0.09 inches.

* * * * *